(12) United States Patent
Wang et al.

(10) Patent No.: US 8,525,505 B2
(45) Date of Patent: Sep. 3, 2013

(54) PWM CONTROLLER AND CONTROL METHOD FOR A DC-DC VOLTAGE CONVERTER

(75) Inventors: Ko-Cheng Wang, Nantou County (TW); Kuo-Ping Liu, Hsinchu County (TW); Chih-Wei Tseng, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 538 days.

(21) Appl. No.: 12/766,246

(22) Filed: Apr. 23, 2010

(65) Prior Publication Data
US 2010/0283441 A1 Nov. 11, 2010

(30) Foreign Application Priority Data

May 8, 2009 (TW) ............................. 98115271 A

(51) Int. Cl.
*G05F 1/575* (2006.01)
(52) U.S. Cl.
USPC ........................................................ 323/286

(58) Field of Classification Search
USPC .................................. 323/286, 282, 284, 285
See application file for complete search history.

(56) References Cited

U.S. PATENT DOCUMENTS

| | | | | |
|---|---|---|---|---|
| 6,879,137 B2* | 4/2005 | Sase et al. | | 323/282 |
| 6,984,966 B2* | 1/2006 | Kubota et al. | | 323/282 |
| 7,319,308 B2* | 1/2008 | Marino et al. | | 323/222 |
| 7,714,562 B2* | 5/2010 | Oswald et al. | | 323/288 |
| 8,093,878 B2* | 1/2012 | Goto et al. | | 323/285 |
| 2009/0058375 A1* | 3/2009 | Gibson et al. | | 323/225 |
| 2010/0270995 A1* | 10/2010 | Laur et al. | | 323/285 |
| 2012/0217941 A1* | 8/2012 | Chen et al. | | 323/271 |

* cited by examiner

*Primary Examiner* — Harry Behm
(74) *Attorney, Agent, or Firm* — Muncy, Geissler, Olds & Lowe, PLLC

(57) ABSTRACT

A PWM controller and control method for a DC-DC voltage converter filter the high-frequency component of the voltage at the phase node between high-side and low-side elements of the voltage converter to generate a signal synchronous and in phase or out-of-phase with the inductor current of the voltage converter, to achieve a low-ripple output voltage and stable loop control.

22 Claims, 11 Drawing Sheets

US 8,525,505 B2

PWM CONTROLLER AND CONTROL METHOD FOR A DC-DC VOLTAGE CONVERTER

FIELD OF THE INVENTION

The present invention is related generally to a DC-DC voltage converter and, more particularly, to a PWM controller and method for a DC-DC voltage converter.

BACKGROUND OF THE INVENTION

In conventional constant on-time or hysteretic mode self-clocking DC-DC voltage converters, the generation of the PWM signal is triggered by the ripple of the output voltage. For a DC-DC voltage converter, an output capacitor having a smaller equivalent series resistance will result in a smaller ripple of the output voltage; however, if the ripple is too small, the loop stability will be impaired. Conversely, an output capacitor having a greater equivalent series resistance contributes to increasing loop stability, and yet the resultant output ripple may be so large as to exceed the specification of the voltage converter. Hence, there is always a trade-off between a small output voltage ripple and enough loop stability.

There have been two approaches to achieve a small output voltage ripple while remaining loop stability, both relying on a resistor-capacitor network to generate a signal synchronous or substantially synchronous with the inductor current for stabilizing the loop. As shown in FIG. 1, a conventional DC-DC converter using a ceramic capacitor for the output capacitor $C_{OUT}$ has a very small equivalent series resistance $R_C$ thereof and therefore, the output voltage $V_{OUT}$ has a small ripple and can be regarded as a DC signal. A resistor voltage divider 1 divides the output voltage $V_{OUT}$ to generate a feedback signal $V_{FB}$. Due to the small ripple of the output voltage $V_{OUT}$, the feedback signal $V_{FB}$ also has a small ripple. The output inductor L is connected in parallel with a resistor-capacitor network which includes an external resistor R3 and an external capacitor C3 connected in series. The voltage across the capacitor C3 is equal to the voltage across the equivalent series resistance $R_L$ of the output inductor L, which is equal to the product of the inductor current $I_L$ and the equivalent series resistance $R_L$. This voltage is converted into a synchronous triangular-wave signal to add to the feedback signal $V_{FB}$ to thereby generate a signal $V_{FB}1$ having a larger ripple, in place of the original feedback signal $V_{FB}$, for the PWM controller. The signal $V_{FB}1$ is equivalent to a feedback signal obtained by dividing an output voltage having a large ripple and thus the loop remains stable despite the fact that the output voltage $V_{OUT}$ has a small ripple. Alternatively, as shown in FIG. 2, an external resistor $R_S$ is serially connected to the low-side element Q2 to extract a signal related to the inductor current $I_L$ to retrieve a larger ripple for loop stability. While the above two approaches realize a small output voltage ripple and loop stability by using external elements, higher component costs will be needed.

Therefore, it is desired a PWM controller and method for realizing a small output voltage ripple and loop stability without the use of additional external elements.

SUMMARY OF THE INVENTION

An object of the present invention is to provide a PWM controller and method for a DC-DC voltage converter to have a small output voltage ripple as well as loop stability.

Another object of the present invention is to provide a PWM controller and method not relying on additional external elements to realize a small output voltage ripple and loop stability.

According to the present invention, a DC-DC voltage converter includes at least one pair of high-side and low-side elements connected by a phase node to control an inductor current to charges an output capacitor to generate an output voltage, and from a phase-node voltage at the phase node, a signal related to the inductor current is extracted for loop stabilization control.

In one embodiment of the present invention, a PWM controller includes a synchronous-signal generator to generate a first signal according to the phase-node voltage and a PWM comparator circuit to generate a PWM signal according to the first signal and a feedback signal related to the output voltage. The first signal is synchronous and out-of-phase with the inductor current. Preferably, the synchronous-signal generator includes a first low-pass filter to filter out the high-frequency component of the phase-node voltage to generate a second signal synchronous and in phase with the inductor current, and an error amplifier to generate the first signal according to the difference between a first reference voltage and the second signal. Preferably, the first reference voltage is generated by a second low-pass filter by filtering out the AC component of the second signal.

Alternatively, the first signal is synchronous and in phase with the inductor current. Preferably, the synchronous-signal generator includes a first low-pass filter to filter out the high-frequency component of the phase-node voltage to generate a second signal synchronous and in phase with the inductor current, and an error amplifier to generate the first signal according to the difference between a first reference voltage and the second signal. Preferably, the first reference voltage is generated by a second low-pass filter by filtering out the AC component of the second signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
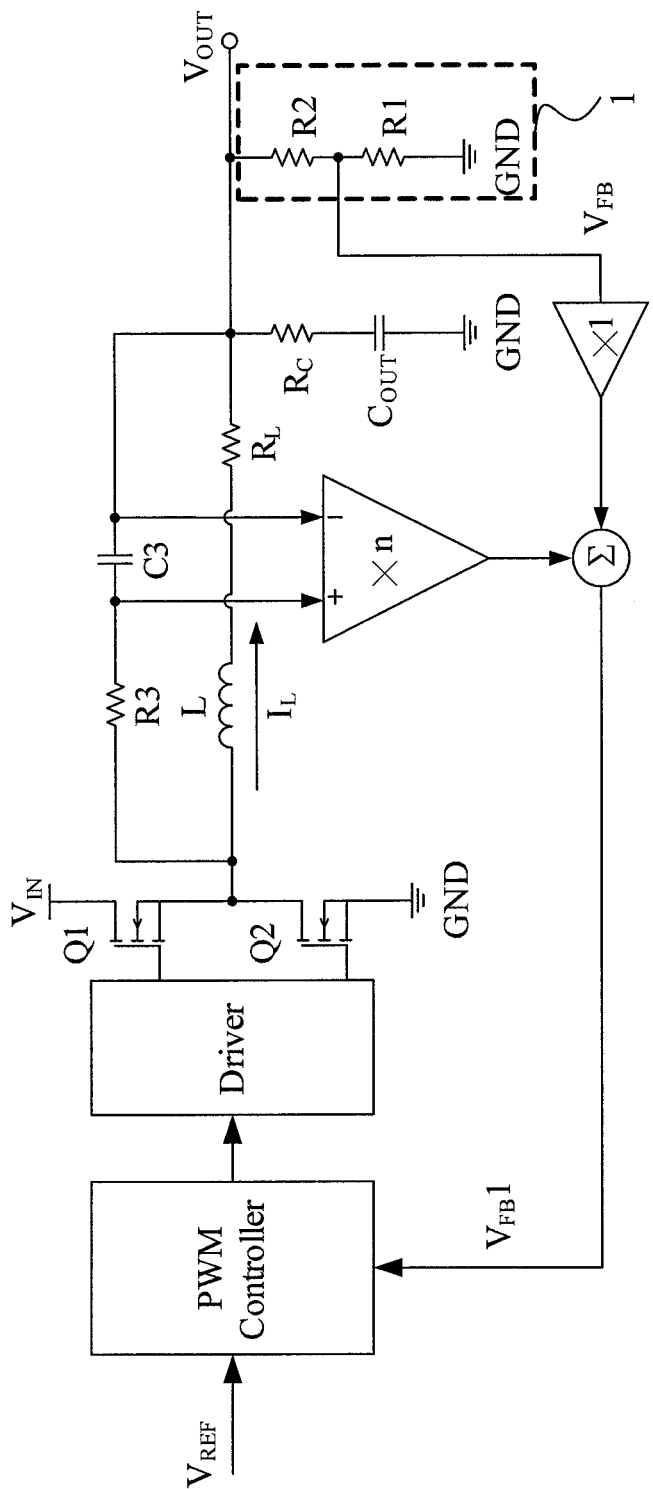
FIG. 1 is a circuit diagram of a conventional DC-DC voltage converter.
Figure 2:
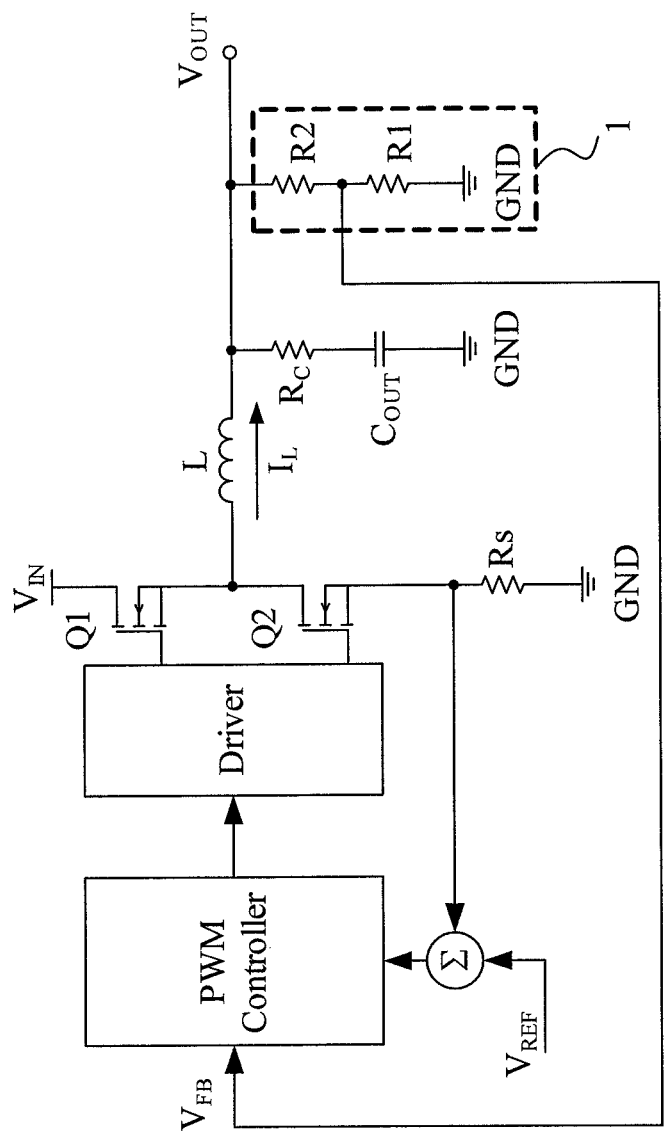
FIG. 2 is a circuit diagram of another conventional DC-DC voltage converter.
Figure 3:
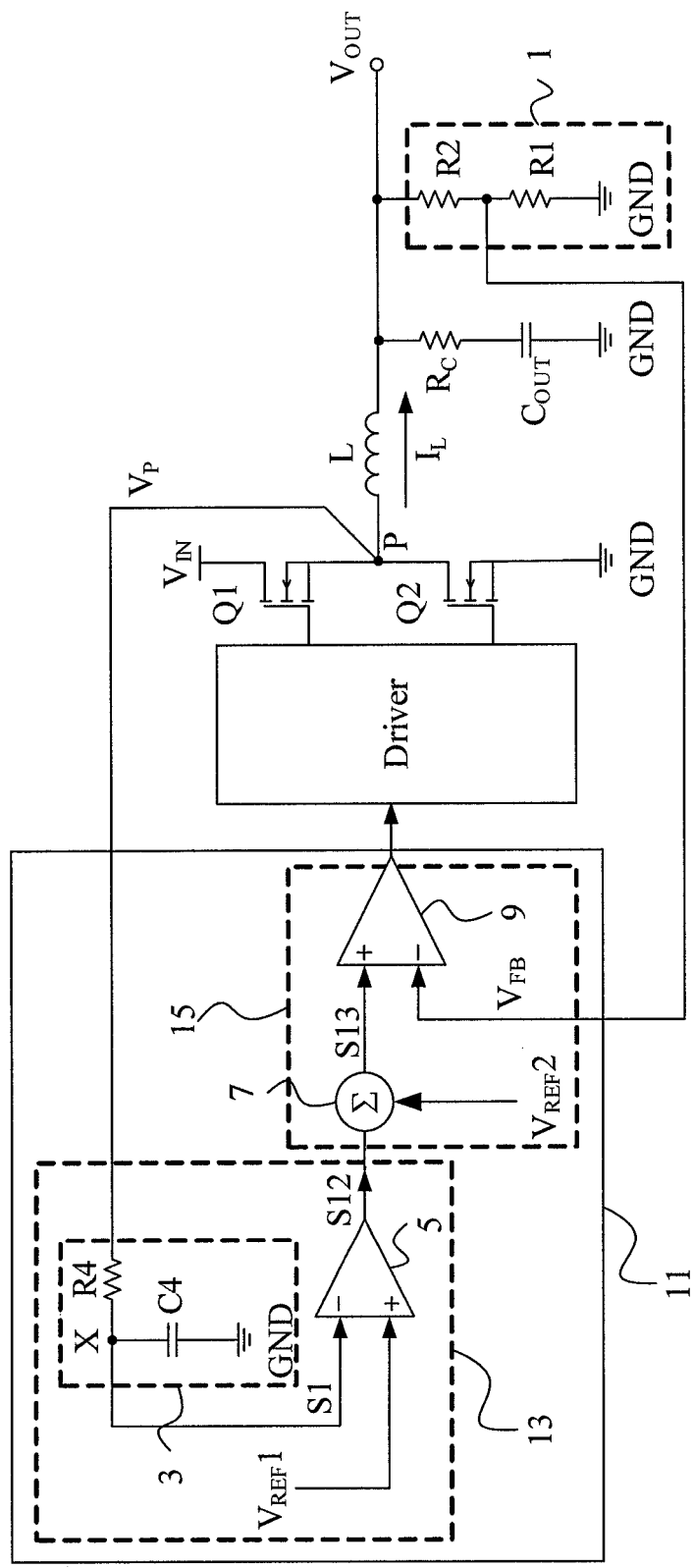
FIG. 3 is a circuit diagram of a first embodiment according to the present invention.

According to the present invention, as shown in FIG. 3, a DC-DC voltage converter includes a MOSFET Q1 serving as a high-side element, a MOSFET Q2 serving as a low-side element, and an output inductor L, all connected to a phase node P. When Q1 is on and Q2 is off, the phase-node voltage $V_P$ is equivalent to the input voltage $V_{IN}$; conversely, when Q1 is off, and Q2 is on, the phase-node voltage $V_P$ is equivalent to zero. Therefore, the phase-node voltage $V_P$ is similar to a square-wave signal. Q1 and Q2 are alternatively switched to control the inductor current $I_L$ to charge an output capacitor $C_{OUT}$ to generate an output voltage $V_{OUT}$. The output capacitor $C_{OUT}$ may employ an element having a very small equivalent series resistance $R_C$ such that the output voltage $V_{OUT}$ has a very small ripple and thus can be regarded as a DC signal. A PWM controller 11 includes a synchronous-signal generator 13 and a PWM comparator circuit 15. According to the phase-node voltage $V_P$, the synchronous-signal generator 13 generates a first signal S12 synchronous and out-of-phase with the inductor current $I_L$. The synchronous-signal generator 13 includes a first low-pass filter 3 and an error amplifier 5. The first low-pass filter 3 includes a resistor R4 and a capacitor C4 configured for filtering out a high-frequency component of the phase-node voltage $V_P$ so as to generate a second signal S1 at a node X. The second signal S1 is synchronous and in-phase with the inductor current $I_L$ and similar to a triangular wave. The error amplifier 5 multiplies the difference between a first reference voltage $V_{REF}1$ and the second signal S1 by an appropriate multiplication factor to generate the first signal S12. The output voltage $V_{OUT}$ of this DC-DC voltage converter is divided by a resistor voltage divider 1 to produce a feedback signal $V_{FB}$, and based on the feedback signal $V_{FB}$ and the first signal S12, the PWM comparator circuit 15 generates a PWM signal to supply to a driver. The PWM comparator circuit 15 includes an adder 7 and a comparator 9. The adder 7 generates a third signal S13 by summing the first signal S12 with a second reference voltage $V_{REF}2$, and in consequence, the third signal S13 has a ripple synchronous and out-of-phase with the inductor current $I_L$. The feedback signal $V_{FB}$ and the third signal S13 are compared with each other by the comparator 9 to generate the PWM signal. Since the third signal S13 has a ripple synchronous and out-of-phase with the inductor current $I_L$, the comparison between the feedback signal $V_{FB}$ and the third signal S13 is equivalent to a comparison between a large-ripple output voltage and a DC reference voltage. Hence, even though the output voltage $V_{OUT}$ has a small ripple, the loop can still function stably without using additional external elements. Furthermore, since a DC-DC voltage converter has a pin connected to the phase node P in the first place for the purpose of current detection, there is no need to add any pins to the controller chip.

Figure 4:
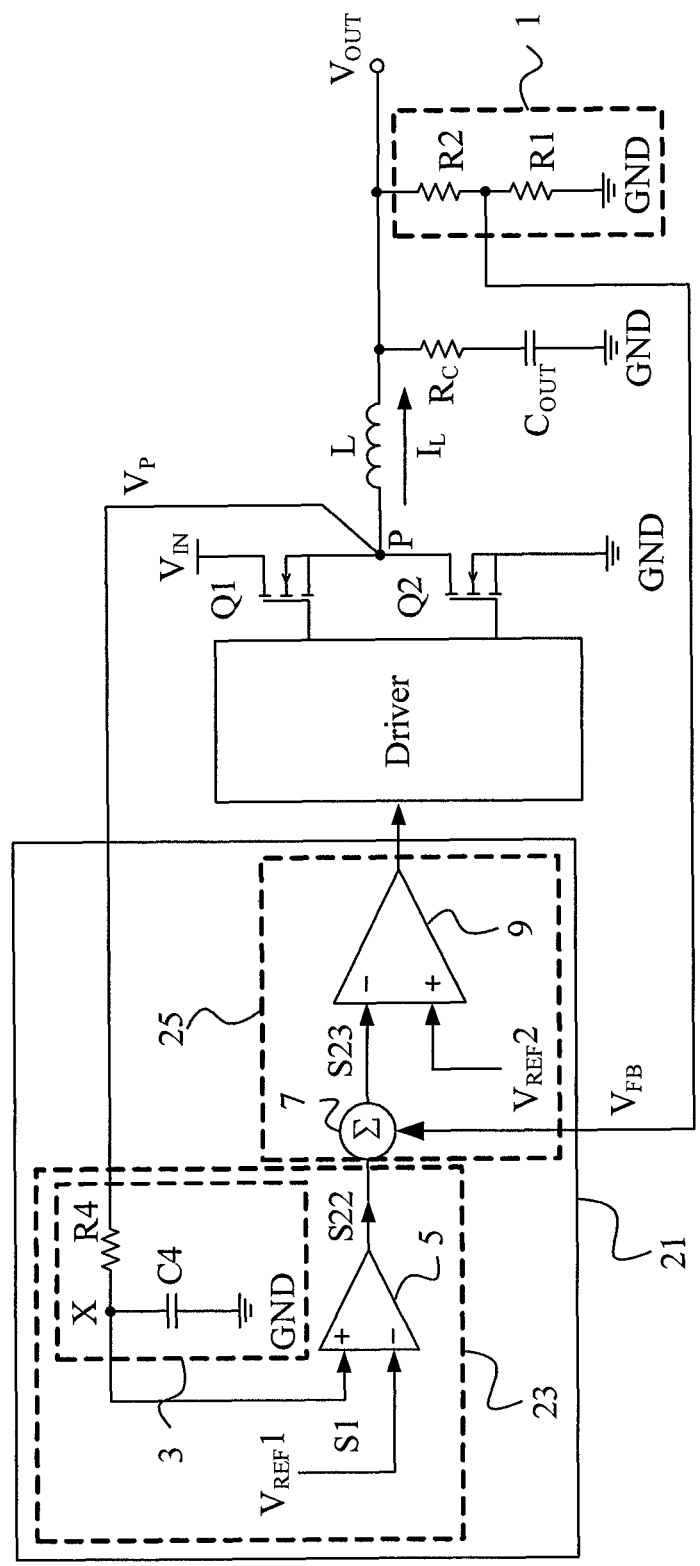
FIG. 4 is a circuit diagram of a second embodiment according to the present invention.

In a second embodiment as shown in FIG. 4, the MOSFETs Q1 and Q2, the output inductor L, the output capacitor $C_{OUT}$, and the resistor voltage divider 1 are configured as in the circuit of FIG. 3, and the PWM controller 21 also includes a synchronous-signal generator 23 and a PWM comparator circuit 25, but has a slightly different configuration from its counterpart shown in FIG. 3. In the synchronous-signal generator 23, the second signal S1 is also generated by the first low-pass filter 3 by filtering out the high-frequency component of the phase-node voltage $V_P$ and thus synchronous and in phase with the inductor current $I_L$ and similar to a triangular wave, but is provided for the positive input of the error amplifier 5 whose negative input is the first reference voltage $V_{REF}1$. Likewise, the error amplifier 5 multiplies the difference between the second signal S1 and the first reference voltage $V_{REF}1$ by an appropriate multiplication factor to generate a first signal S22 which is synchronous and in phase with the inductor current $I_L$. In the PWM comparator circuit 25, the feedback signal $V_{FB}$ is one of the inputs of the adder 7 and to add to the first signal S22 to generate a third signal S23. The third signal S23 is then provided for the negative input of the comparator 9 whose positive input is the second reference voltage $V_{REF}2$, thereby generating the PWM signal. After the feedback signal $V_{FB}$ having a small ripple is superimposed on the first signal S22 which is synchronous and in phase with the inductor current $I_L$, the resultant third signal S23 is equivalent to a signal generated by dividing an output voltage having a large ripple. Therefore, the comparison of the second reference voltage $V_{REF}2$ with the third signal S23 is equivalent to the comparison of an output voltage having a large ripple with a DC reference voltage.

Figure 5:
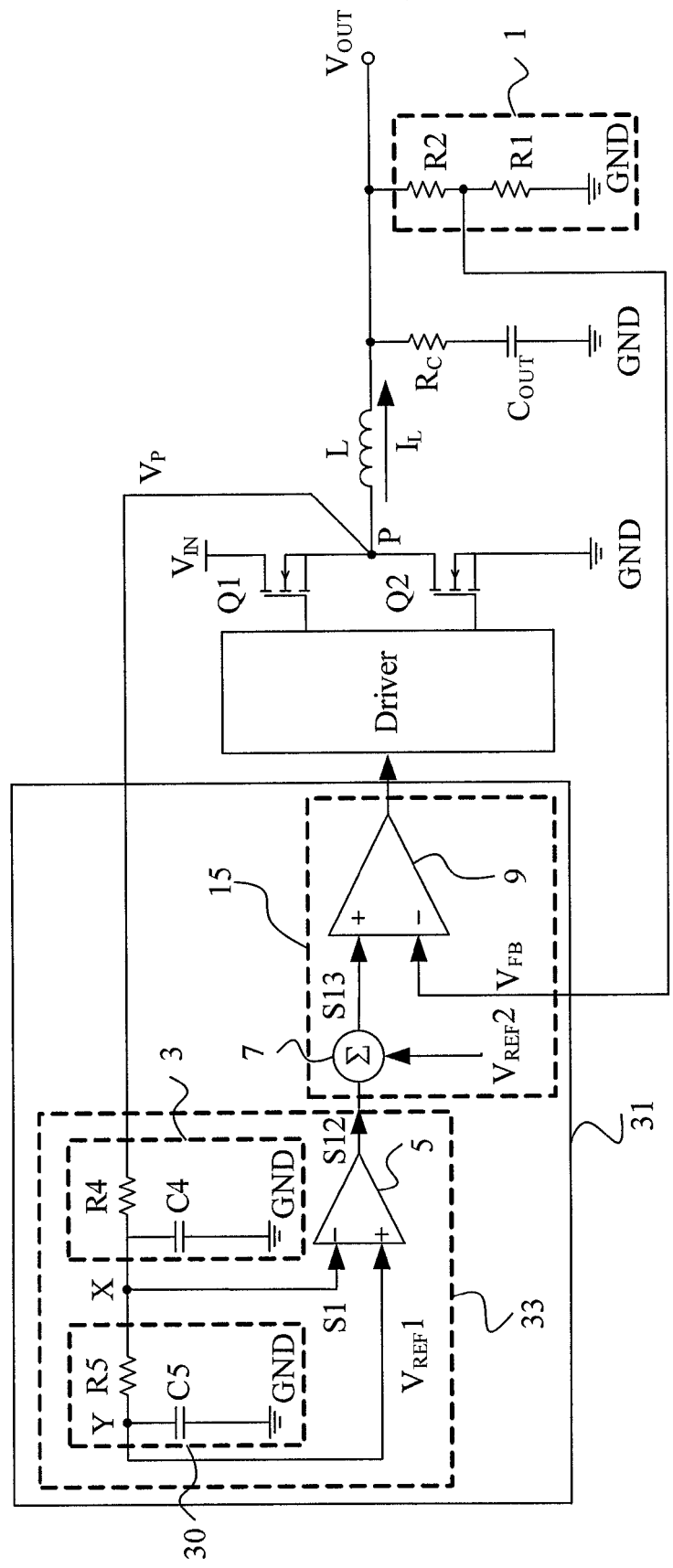
FIG. 5 is a circuit diagram of a third embodiment according to the present invention.

The third embodiment shown in FIG. 5 has a same configuration as that of FIG. 3, except that a synchronous-signal generator 33 is slightly different from its counterpart shown in FIG. 3. Likewise, the synchronous-signal generator 33 is in a PWM controller 31 including the PWM comparator circuit 15 and, however, includes a second low-pass filter 30 in addition to the first low-pass filter 3 and the error amplifier 5. The second low-pass filter 30 composed of a resistor R5 and a capacitor C5 filters out most of the AC component of the second signal S1 to generate a first reference voltage $V_{REF}1$ which is similar to a DC voltage and represents the DC component of the output voltage $V_{OUT}$. Therefore, the first signal S12 generated by the error amplifier 5 from the difference between the first reference voltage $V_{REF}1$ and the second signal S1 is proportional to the slope of the inductor current $I_L$ and, in an IC package where no pins are provided for feedback of the output voltage $V_{OUT}$, serves to provide the PWM controller 31 with a signal representing the output voltage $V_{OUT}$.

Figure 6:
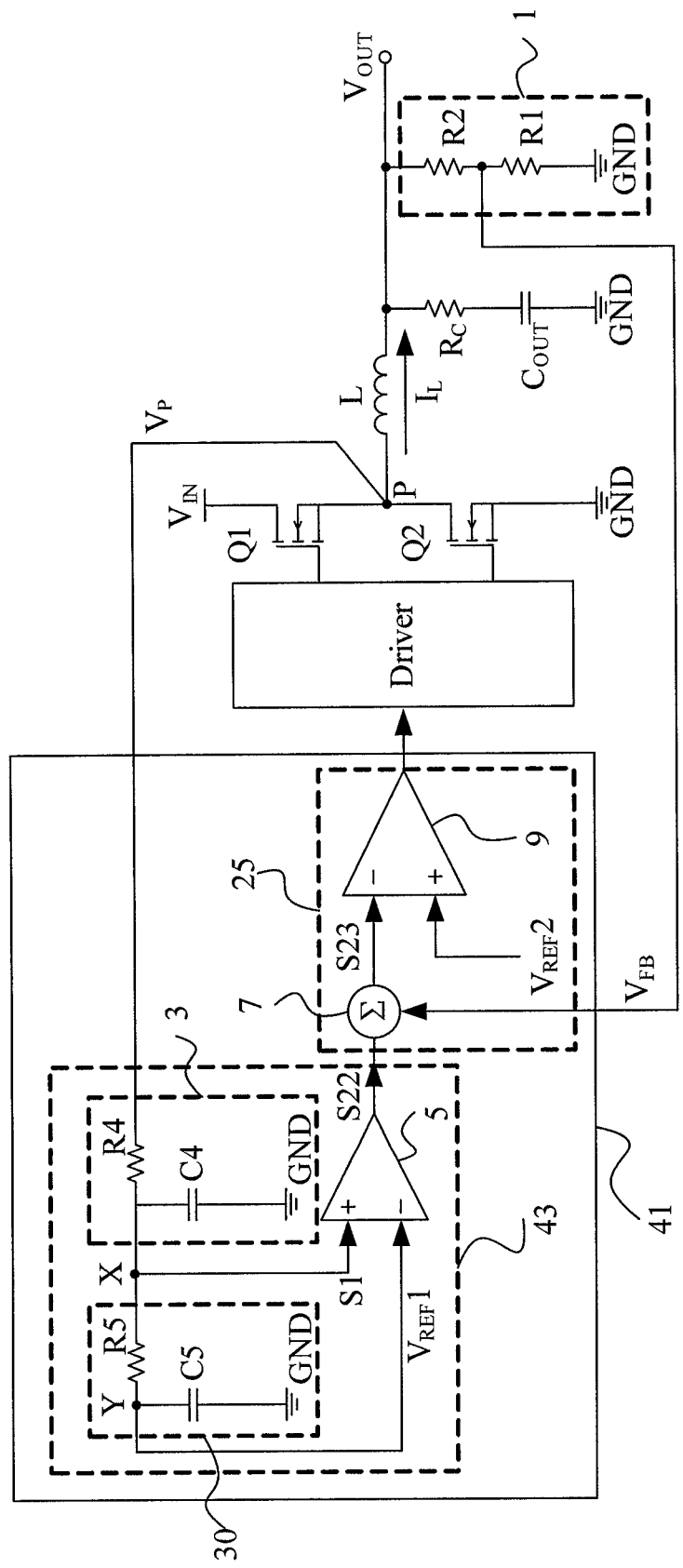
FIG. 6 is a circuit diagram of a fourth embodiment according to the present invention.

The fourth embodiment shown in FIG. 6 has a same configuration as that of FIG. 4, except that a synchronous-signal generator 43 is slightly different from its counterpart shown in FIG. 4. Likewise, the synchronous-signal generator 43 is in a PWM controller 41 including the PWM comparator circuit 25 and, however, includes the second low-pass filter 30 in addition to the first low-pass filter 3 and the error amplifier 5, to filter out most of the AC component of the second signal S1 to generate the first reference voltage $V_{REF}1$ similar to a DC voltage representing the DC component of the output voltage $V_{OUT}$. This embodiment has the same advantages as those of the circuit shown in FIG. 5.

Figure 7:
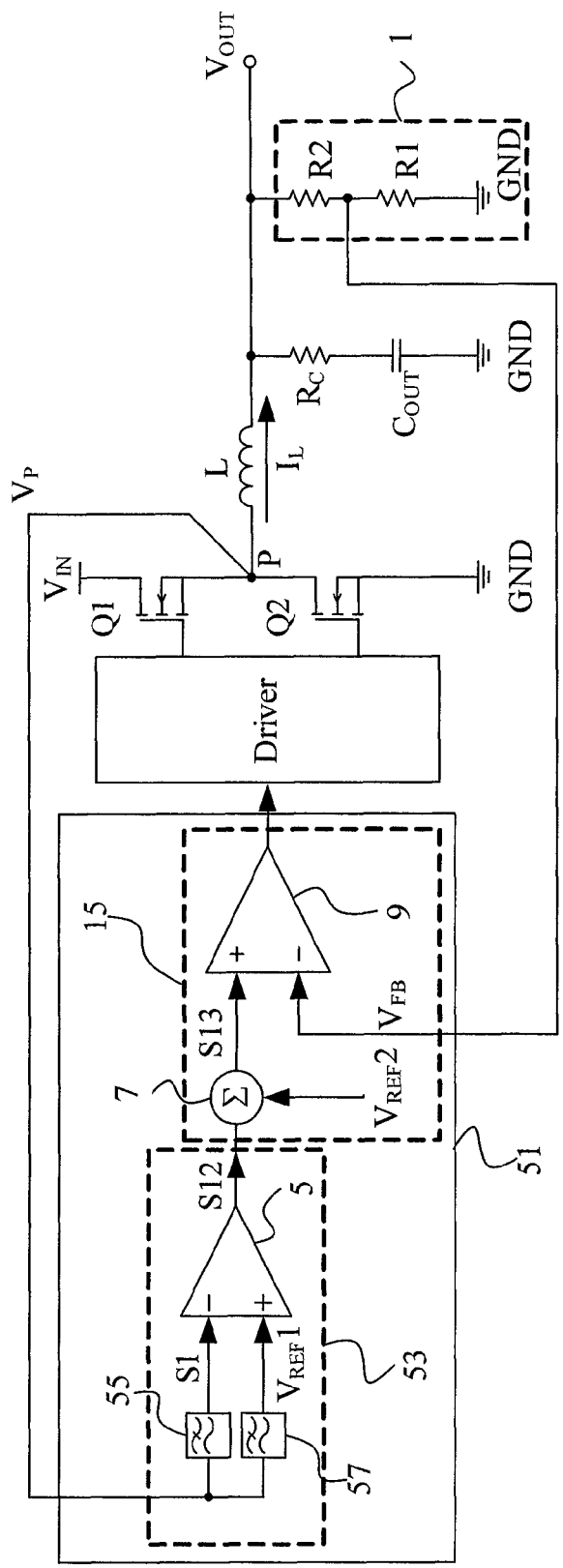
FIG. 7 is a circuit diagram of a fifth embodiment according to the present invention.

The fifth embodiment shown in FIG. 7 has a same configuration as that of FIG. 3, except that a synchronous-signal generator 53 is slightly different from its counterpart shown in FIG. 3. Likewise, the synchronous-signal generator 53 is in a PWM controller 51 including the PWM comparator circuit 15 and, however, includes a second low-pass filter 57 in addition to a first low-pass filter 55 and the error amplifier 5. The first low-pass filter 55 and the second low-pass filter 57 are both connected to the phase node P but have different time constants. The first low-pass filter 55 filters out the high-frequency component of the phase-node voltage $V_P$ to generate the first signal S1, and the second low-pass filter 57 filters out most of the AC component of the phase-node voltage $V_P$ to generate a first reference voltage $V_{REF}1$ similar to a DC voltage. The error amplifier 5 multiplies the difference between the first reference voltage $V_{REF}1$ and the second signal S1 by an appropriate multiplication factor to generate a first signal S12 which is synchronous and out-of-phase with the inductor current $I_L$. This embodiment has the same advantages as those of the circuit shown in FIG. 5.

Figure 8:
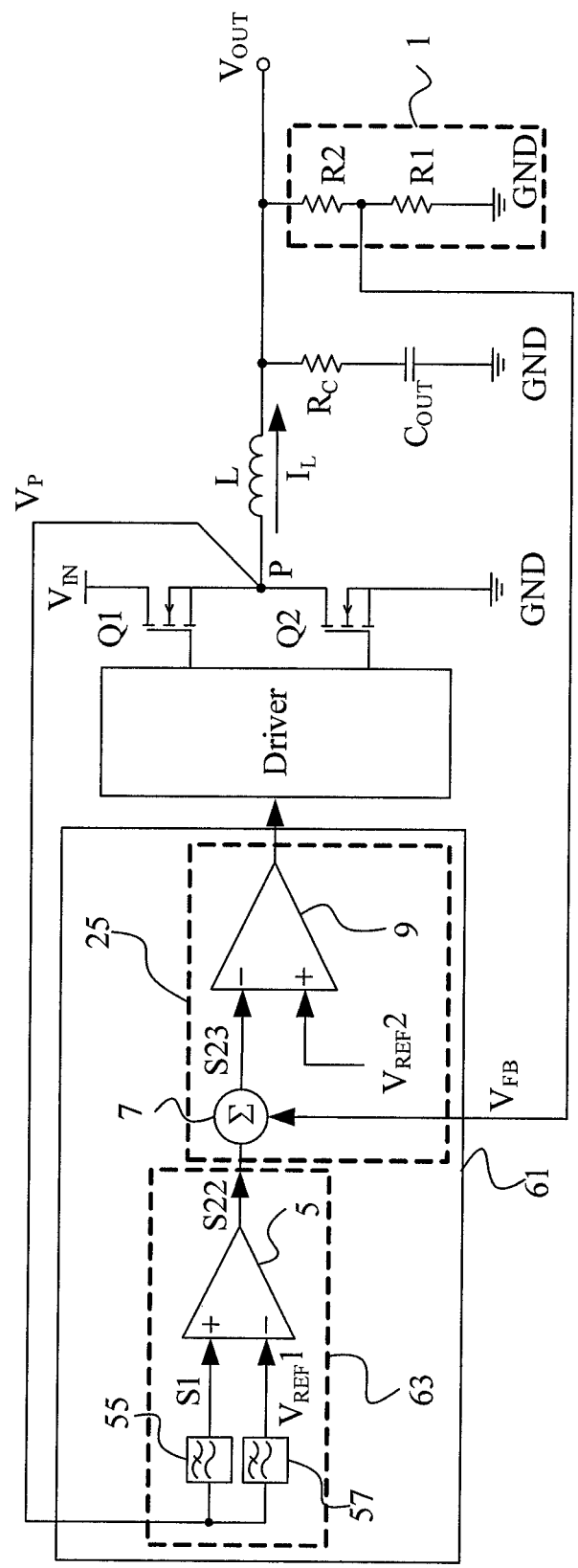
FIG. 8 is a circuit diagram of a sixth embodiment according to the present invention.

The sixth embodiment shown in FIG. 8 has a same configuration as that of FIG. 4, except that a synchronous-signal generator 63 is slightly different from its counterpart shown in FIG. 4. Likewise, the synchronous-signal generator 63 is in a PWM controller 61 including the PWM comparator circuit 25 and, however, includes the second low-pass filter 57 in addition to the first low-pass filter 55 and the error amplifier 5. The first low-pass filter 55 and the second low-pass filter 57 are both connected to the phase node P but have different time constants. The first low-pass filter 55 filters out the high-frequency component of the phase-node voltage $V_P$ to generate the first signal S1, and the second low-pass filter 57 filters out most of the AC component of the phase-node voltage $V_P$ to generate a first reference voltage $V_{REF}1$ similar to a DC voltage. The error amplifier 5 multiplies the difference between the second signal S1 and the first reference voltage $V_{REF}1$ by an appropriate multiplication factor to generate a first signal S22 which is synchronous and in phase with the inductor current $I_L$. This embodiment has the same advantages as those of the circuit shown in FIG. 5.

Figure 9:
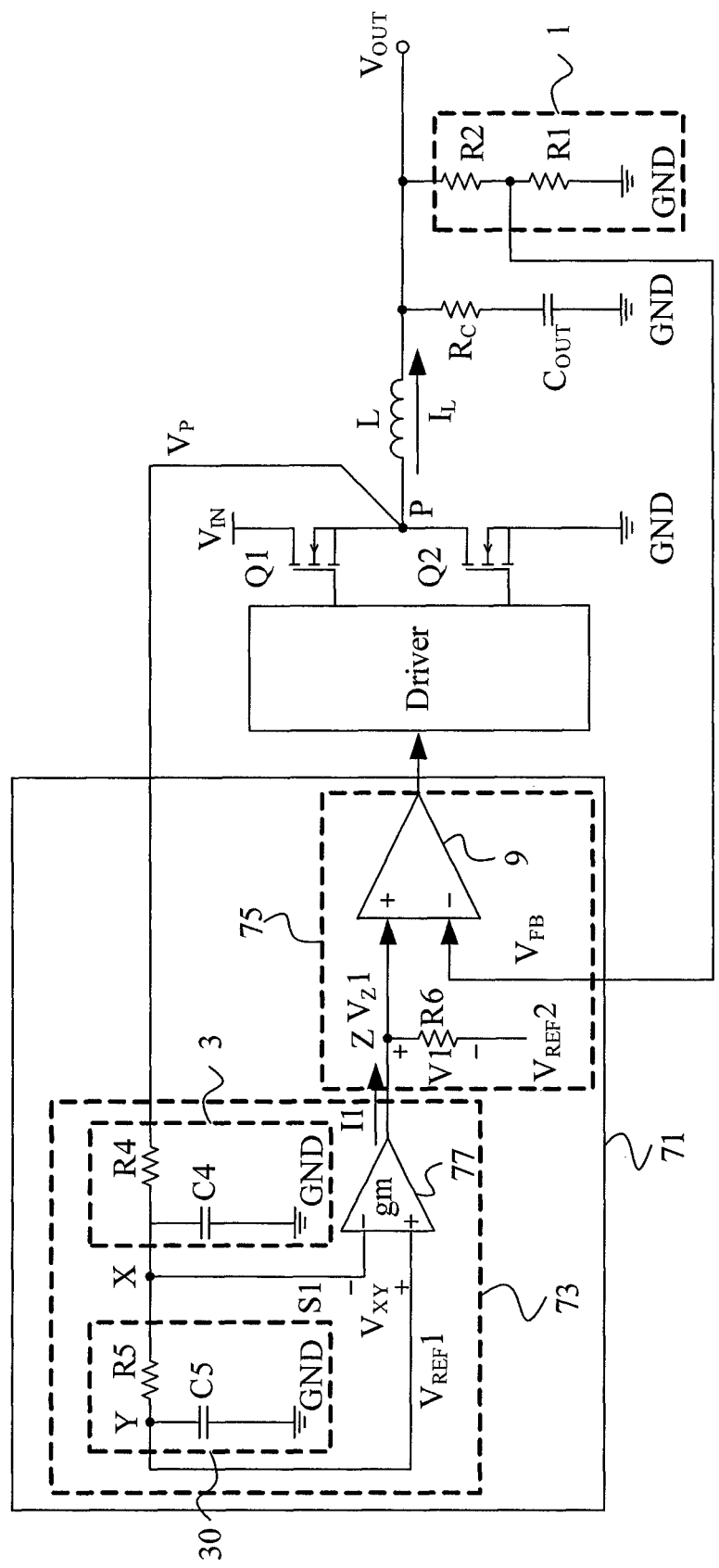
FIG. 9 is a circuit diagram of a seventh embodiment according to the present invention.

The seventh embodiment shown in FIG. 9 has a same configuration as that of FIG. 5, except that in a PWM controller 71, a synchronous-signal generator 73 uses a transconductance amplifier 77 to implement the error amplifier 5 shown in FIG. 5, which converts the difference $V_{XY}$ between the second signal S1 and the first reference voltage $V_{REF}1$ into a first signal I1 equal to $gm \times V_{XY}$ and synchronous and out-of-phase with the inductor current $I_L$. On the other hand, a PWM comparator circuit 75 uses a resistor R6 to implement the adder 7 shown in FIG. 5, which is connected between the positive input terminal Z of the comparator 9 and the input terminal receiving the second reference voltage $V_{REF}2$ to generate a first voltage $V1=gm \times V_{XY} \times R6$ responsive to the first signal I1. The first voltage V1, which is synchronous and out-of-phase with the inductor current $I_L$, is superimposed on the second reference voltage $V_{REF}2$ to generate a second voltage $V_Z1=V_{REF}2+gm \times V_{XY} \times R6$. The comparator 9 compares the second voltage $V_Z1$ with the feedback signal $V_{FB}$ and generates a PWM signal accordingly. In this embodiment, the second voltage $V_Z1$ includes a ripple which is synchronous and out-of-phase with the inductor current $I_L$, and has a desired ripple amplification factor by adjusting the transconductance gm of the transconductance amplifier 77 and the resistance of the resistor R6.

Figure 10:
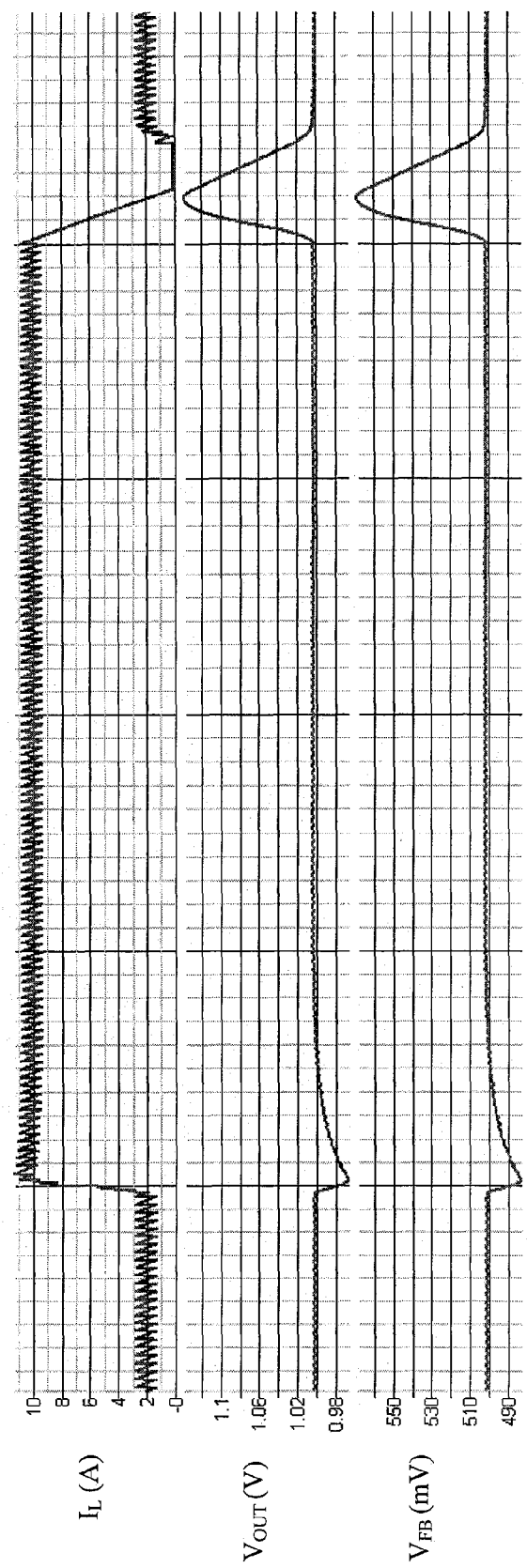
FIG. 10 is a diagram of a simulated output from a constant on-time DC-DC voltage converter using the circuit of FIG. 9.

FIG. 10 is a graph of simulated output from a constant on-time DC-DC voltage converter using the circuit of FIG. 9. Despite the equivalent series resistance $R_C$ of the output capacitor $C_{OUT}$ is very small, the system could remain stable operation and has a very small output voltage ripple during a load transient.

Figure 11:
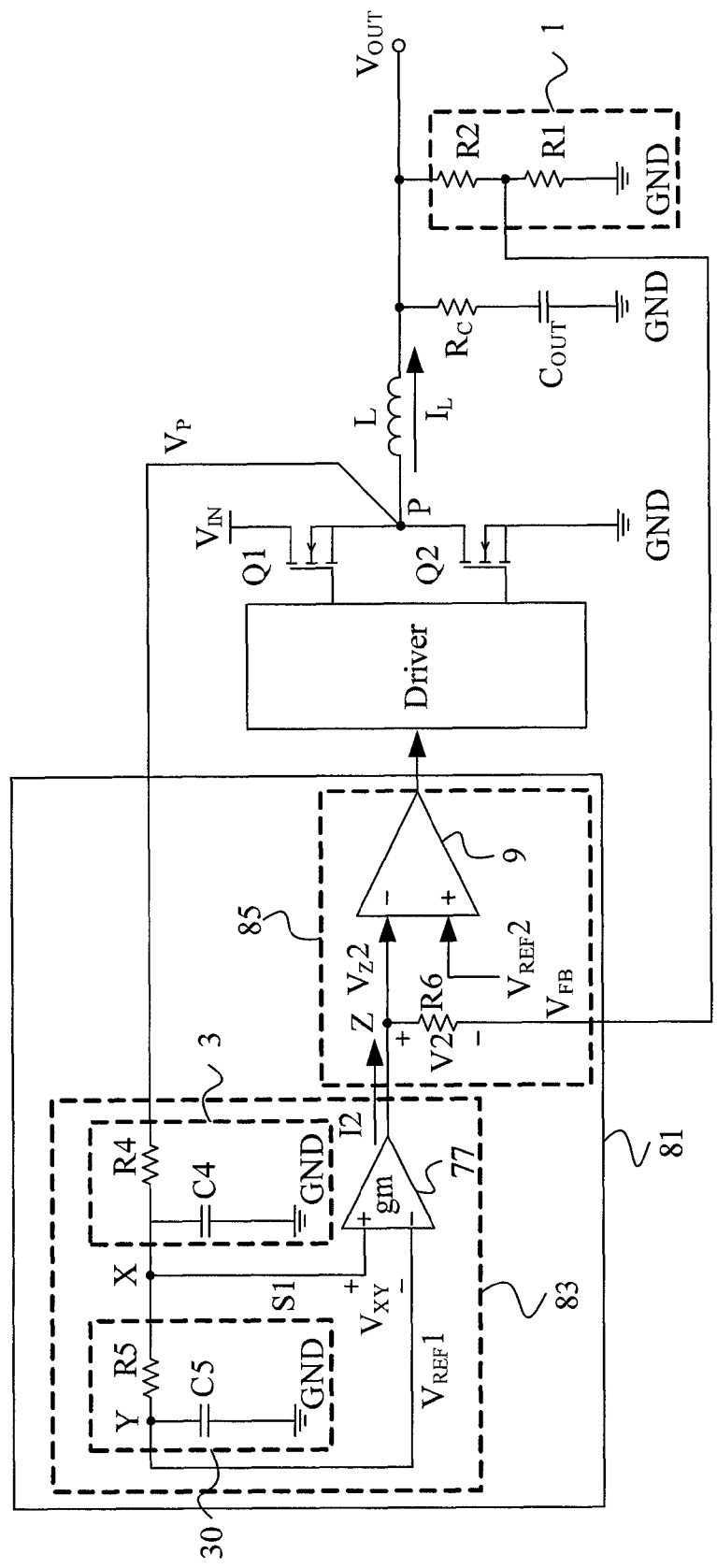
FIG. 11 is a circuit diagram of an eighth embodiment according to the present invention.

The eighth embodiment shown in FIG. 11 has a same configuration as that of FIG. 6, except that in a PWM controller 81, a synchronous signal generator 83 uses the transconductance amplifier 77 to implement the error amplifier 5 shown in FIG. 6, which converts the difference $V_{XY}$ between the second signal S1 and the first reference voltage $V_{REF}1$ into a first current signal $I2=gm \times V_{XY}$ and synchronous and in phase with the inductor current $I_L$. On the other hand, a PWM comparator circuit 85 uses the resistor R6 to implement the adder 7 shown in FIG. 6, which is connected between the negative input terminal Z of the comparator 9 and the input terminal receiving the feedback signal $V_{FB}$ to generate a first voltage $V2=gm \times V_{XY} \times R6$ responsive to the first signal I2. The first voltage V2, which is synchronous and in phase with the inductor current $I_L$, is superimposed on the feedback signal $V_{FB}$ to generate a second voltage $V_Z2=V_{FB}+gm \times V_{XY} \times R6$. The comparator 9 compares the second voltage $V_Z2$ with the second reference voltage $V_{REF}2$ and generates a PWM signal accordingly. In this embodiment, the second voltage $V_Z2$ includes a ripple synchronous and in phase with the inductor current $I_L$, and has a desired ripple amplification factor by adjusting the transconductance gm of the transconductance amplifier 77 and the resistance of the resistor R6.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A PWM controller for a DC-DC voltage converter having at least one pair of high-side and low-side elements connected by a phase node and switched by a PWM signal to control an inductor current to charge an output capacitor to generate an output voltage, the PWM controller comprising:
   a synchronous-signal generator connected to the phase node, filtering out a high-frequency component of a phase-node voltage at the phase node to generate a first signal synchronous and out-of-phase with the inductor current; and
   a PWM comparator circuit connected to the synchronous-signal generator, generating the PWM signal according to the first signal and a feedback signal related to the output voltage;
   wherein the synchronous-signal generator comprises:
      a first low-pass filter connected to the phase node, generating a second signal synchronous and in phase with the inductor current;
      an error amplifier connected to the first low-pass filter and the PWM comparator circuit, receiving the second signal at a negative input terminal and a reference voltage at a positive input terminal to generate the first signal; and
      a second low-pass filter connected to the first low-pass filter and the error amplifier, filtering out an AC component of the second signal to generate the reference voltage.

2. The PWM controller of claim 1, wherein the error amplifier comprises a transconductance amplifier connected to the first low-pass filter, converting a difference between the second signal and the first reference voltage into a current as the first signal.

3. A PWM controller for a DC-DC voltage converter having at least one pair of high-side and low-side elements connected by a phase node and switched b a PWM signal to control an inductor current to charge an output capacitor to generate an output voltage, the PWM controller comprising:
   a synchronous-signal generator connected to the phase node, filtering out a high-frequency component of a phase-node voltage at the phase node to generate a first signal synchronous and out-of-phase with the inductor current; and
   a PWM comparator circuit connected to the synchronous-signal generator, generating the PWM signal according to the first signal and a feedback signal related to the output voltage;
   wherein the synchronous-signal generator comprises:
      a first low-pass filter connected to the phase node, generating a second signal synchronous and in phase with the inductor current;

an error amplifier connected to the first low-pass filter and the PWM comparator circuit, receiving the second signal at a negative input terminal and a reference voltage at a positive input terminal to generate the first signal; and a second low-pass filter connected to the phase node and the error amplifier, filtering out an AC component of the phase-node voltage to generate the reference voltage.

4. A PWM controller for a DC-DC voltage converter having at least one pair of high-side and low-side elements connected by a phase node and switched by a PWM signal to control an inductor current to charge an output capacitor to generate an output voltage, the PWM controller comprising:

a synchronous-signal generator connected to the phase node, filtering out a high-frequency component of a phase-node voltage at the phase node to generate a first signal synchronous and out-of-phase with the inductor current; and a PWM comparator circuit connected to the synchronous-signal generator, generating the PWM signal according to the first signal and a feedback signal related to the output voltage;

wherein the synchronous-signal generator comprises:

a first low-pass filter connected to the phase node, generating a second signal synchronous and in phase with the inductor current; and an error amplifier connected to the first low-pass filter and the PWM comparator circuit, receiving the second signal at a negative input terminal and a first reference voltage at a positive input terminal to generate the first signal;

wherein the error amplifier comprises a transconductance amplifier connected to the first low-pass filter, converting a difference between the second signal and the first reference voltage into a current as the first signal;

wherein the PWM comparator circuit comprises:

a resistor connected to the transconductance amplifier, generating a first voltage responsive to the first signal, to superimpose on a second reference voltage to generate a second voltage; and a comparator connected to the resistor, comparing the second voltage with the feedback signal to generate the PWM signal;

wherein the first voltage is synchronous and out-of-phase with the inductor current.

5. A PWM controller for a DC-DC voltage converter having at least one pair of high-side and low-side elements connected by a phase node and switched by a PWM signal to control an inductor current to charge an output capacitor to generate an output voltage, the PWM controller comprising:

a synchronous-signal generator connected to the phase node, filtering out a high-frequency component of a phase-node voltage at the phase node to generate a first signal synchronous and out-of-phase with the inductor current; and a PWM comparator circuit connected to the synchronous-signal generator, generating the PWM signal according to the first signal and a feedback signal related to the output voltage;

wherein the PWM comparator circuit comprise:

an adder connected to the synchronous-signal generator, superimposing the first signal on a reference voltage to generate a third signal; and a comparator connected to the adder, receiving the third signal at a positive input terminal and the feedback signal at a negative input terminal to generate the PWM signal.

6. A PWM controller for a DC-DC voltage converter having at least one pair of high-side and low-side elements connected by a phase node and switched by a PWM signal to control an inductor current to charge an output capacitor to generate an output voltage, the PWM controller comprising:

a synchronous-signal generator connected to the phase node, filtering out a high-frequency component of a phase-node voltage at the phase node to generate a first signal synchronous and in phase with the inductor current; and a PWM comparator circuit connected to the synchronous-signal generator, generating the PWM signal according to the first signal and a feedback signal related to the output voltage;

wherein the synchronous-signal generator comprises:

a first low-pass filter connected to the phase node, generating a second signal synchronous and in phase with the inductor current;

an error amplifier connected to the first low-pass filter and the PWM comparator circuit, receiving the second signal at a positive input terminal and a reference voltage at a negative input terminal to generate the first signal; and a second low-pass filter connected to the first low-pass filter and the error amplifier, filtering out an AC component of the second signal to generate the reference voltage.

7. The PWM controller of claim 6, wherein the error amplifier comprises a transconductance amplifier connected to the first low-pass filter, converting a difference between the second signal and the reference voltage into a current as the first signal.

8. A PWM controller for a DC-DC voltage converter having at least one pair of high-side and low-side elements connected by a phase node and switched by a PWM signal to control an inductor current to charge an output capacitor to generate an output voltage, the PWM controller comprising:

a synchronous-signal generator connected to the phase node, filtering out a high-frequency component of a phase-node voltage at the phase node to generate a first signal synchronous and in phase with the inductor current; and a PWM comparator circuit connected to the synchronous-signal generator, generating the PWM signal according to the first signal and a feedback signal related to output voltage;

wherein the synchronous-signal generator comprises:

a first low-pass filter connected to the phase node, generating a second signal synchronous and in phase with the inductor current;

an error amplifier connected to the first low-pass filter and the PWM comparator circuit, receiving the second signal at a positive input terminal and a reference voltage at a negative input terminal to generate the first signal; and a second low-pass filter connected to the phase node and the error amplifier, filtering out an AC component of the phase-node voltage to generate the reference voltage.

9. The PWM controller of claim 8, wherein the error amplifier comprises a transconductance amplifier connected to the first low-pass filter, converting a difference between the second signal and the reference voltage into a current as the first signal.

10. A PWM controller for a DC-DC voltage converter having at least one pair of high-side and low-side elements connected by a phase node and switched by a PWM signal to control an inductor current to charge an output capacitor to generate an output voltage, the PWM controller comprising:
  a synchronous-signal generator connected to the phase node, filtering out a high-frequency component of a phase-node voltage at the phase node to generate a first signal synchronous and in phase with the inductor current; and
  a PWM comparator circuit connected to the synchronous-signal generator, generating the PWM signal according to the first signal and a feedback signal related to the output voltage;
  wherein the synchronous-signal generator comprises:
    a first low-pass filter connected to the phase node, generating a second signal synchronous and in phase with the inductor current; and
    a transconductance amplifier connected to the first low-pass filter, converting a difference between the second signal and a first reference voltage into a current as the first signal;
  wherein the PWM comparator circuit comprises:
    a resistor connected to the transconductance amplifier, generating a first voltage responsive to the first signal, to superimpose on the feedback signal to generate a second voltage; and
    a comparator connected to the resistor, comparing the second voltage with a second reference voltage to generate the PWM signal;
  wherein the first voltage is synchronous and in phase with the inductor current.

11. A PWM controller for a DC-DC voltage converter having at least one pair of high-side and low-side elements connected by a phase node and switched by a PWM signal to control an inductor current to charge an output capacitor to generate an output voltage, the PWM controller comprising:
  a synchronous-signal generator connected to the phase node, filtering out a high-frequency component of a phase-node voltage at the phase node to generate a first signal synchronous and in phase with the inductor current; and
  a PWM comparator circuit connected to the synchronous-signal generator, generating the PWM signal according to the first signal and a feedback signal related to the output voltage;
    wherein the PWM comparator circuit comprises:
      an adder connected to the synchronous-signal generator, superimposing the first signal on the feedback signal to generate a third signal; and
      a comparator connected to the adder, receiving the third signal at a negative input terminal and a reference voltage at a positive input terminal to generate the PWM signal.

12. A PWM control method for a DC-DC voltage converter having at least one pair of high-side and low-side elements connected by a phase node and switched by a PWM signal to control an inductor current to charge an output capacitor to generate an output voltage, the PWM control method comprising:
  a.) filtering out a high-frequency component of a phase-node voltage at the phase node for generating a first signal synchronous and out-of-phase with the inductor current; and
  b.) generating the PWM signal according to the first signal and a feedback signal related to the output voltage;
  wherein the step a comprises:
    c.) filtering out the high-frequency component of the phase-node voltage for generating a second signal synchronous and in phase with the inductor current;
    d.) filtering out an AC component of the second signal for generating a reference voltage; and
    e.) amplifying a difference between the reference voltage and the second signal for generating the signal.

13. The PWM control method of claim 12, wherein the step e comprises converting the difference between the second signal and the reference voltage into a current as the first signal.

14. A PWM control method for a DC-DC voltage converter having at least one pair of high-side and low-side elements connected by a phase node and switched by a PWM signal to control an inductor current to charge an output capacitor to generate an output voltage, the PWM control method comprising:
  a.) filtering out a high-frequency component of a phase-node voltage at the phase node for generating a first signal synchronous and out-of-phase with the inductor current; and
  b.) generating the PWM signal according to the first signal and a feedback signal related to the output voltage;
  wherein the step a comprises:
    c.) filtering out the high-frequency component of the phase-node voltage for generating a second signal synchronous and in phase with the inductor current;
    d.) filtering out an AC component of the phase-node voltage for generating a reference voltage; and
    e.) amplifying a difference between the reference voltage and the second signal for generating the first signal.

15. A PWM control method for a DC-DC voltage converter having at least one pair of high-side and low-side elements connected by a phase node and switched by a PWM signal to control an inductor current to charge an output capacitor to generate an output voltage, the PWM control method comprising:
  a.) filtering out a high-frequency component of a phase-node voltage at the phase node for generating a first signal synchronous and out-of-phase with the inductor current; and
  b.) generating the PWM signal according to the first signal and a feedback signal related to the output voltage;
  wherein the step a comprises:
    c.) filtering out the high-frequency component of the phase-node voltage for generating a second signal synchronous and in phase with the inductor current; and
    d.) converting a difference between the second signal and a first reference voltage into a current as the first signal;
  wherein the step b comprises:
    responsive to the first signal, generating a first voltage synchronous and out-of-phase with the inductor current;
    superimposing the first voltage on a second reference voltage for generating a second voltage; and
    comparing the second voltage with the feedback signal for generating the PWM signal.

16. A PWM control method for a DC-DC voltage converter having at least one pair of high-side and low-side elements connected by a phase node and switched by a PWM signal to control an inductor current to charge an output capacitor to generate an output voltage, the PWM control method comprising:

a.) filtering out a high-frequency component of a phase-node voltage at the phase node for generating a first signal synchronous and out-of-phase with the inductor current; and b.) generating the PWM signal according to the first signal and a feedback signal related to the output voltage;

wherein the step b comprises:
superimposing the first signal on a reference voltage for generating a second signal; and
comparing the second signal with the feedback signal for generating the PWM signal.

17. A PWM control method for a DC-DC voltage converter having at least one pair of high-side and low-side elements connected by a phase node and switched by a PWM signal to control an inductor current to charge an output capacitor to generate an output voltage, the PWM control method comprising:

a.) filtering out a high-frequency component of a phase-node voltage at the phase node for generating a first signal synchronous and in phase with the inductor current; and b.) generating the PWM signal according to the first signal and a feedback signal related to the output voltage;

wherein the step a comprises:
c.) filtering out the high-frequency component of the phase-node voltage for generating a second signal synchronous and in phase with the inductor current;
d.) filtering out an AC component of the second signal for generating a reference voltage; and
e.) amplifying a difference between the second signal and the reference voltage for generating the first signal.

18. The PWM control method of claim 17, wherein the step e comprises converting the difference between the second signal and the reference voltage into a current as the first signal.

19. A PWM control method for a DC-DC voltage converter having at least one pair of high-side and low-side elements connected by a phase node and switched by a PWM signal to control an inductor current to charge an output capacitor to generate an output voltage, the PWM control method comprising:

a.) filtering out a high-frequency component of a phase-node voltage at the phase node for generating a first signal synchronous and in phase with the inductor current; and b.) generating the PWM signal according to the first signal and a feedback signal related to the output voltage;

wherein the step a comprises:
c.) filtering out the high-frequency component of the phase-node voltage for generating a second signal synchronous and in phase with the inductor current;
d.) filtering out an AC component of the phase-node voltage for generating a reference voltage; and
e.) amplifying a difference between the second signal and the reference voltage for generating the first signal.

20. The PWM control method of claim 19, wherein the step e comprises converting the difference between the second signal and the reference voltage into a current as the first signal.

21. A PWM control method for a DC-DC voltage converter having at least one pair of high-side and low-side elements connected by a phase node and switched by a PWM signal to control an inductor current to charge an output capacitor to generate an output voltage, the PWM control method comprising:

a.) filtering out a high-frequency component of a phase-node voltage at the phase node for generating a first signal synchronous and in phase with the inductor current; and b.) generating the PWM signal according to the first signal and a feedback signal related to the output voltage;

wherein the step a comprises:
c.) filtering out the high-frequency component of the phase- node voltage for generating a second signal synchronous and in phase with the inductor current; and
d.) converting a difference between the second signal and a first reference voltage into a current as the first signal;

wherein the step b comprises:
responsive to the first signal, generating a first voltage synchronous and in phase with the inductor current;
superimposing the first voltage on the feedback signal for generating a second voltage; and
comparing the second voltage with a second reference voltage for generating the PWM signal.

22. A PWM control method for a DC-DC voltage converter having at least one pair of high-side and low-side elements connected by a phase node and switched by a PWM signal to control an inductor current to charge an output capacitor to generate an output voltage, the PWM control method comprising:

a.) filtering out a high-frequency component of a phase-node voltage at the phase node for generating a first signal synchronous and in phase with the inductor current; and b.) generating the PWM signal according to the first signal and a feedback signal related to the output voltage;

wherein the step b comprises:
superimposing the first signal on the feedback signal for generating a second signal; and
comparing the second signal with a reference voltage for generating the PWM signal.

* * * * *